United States Patent [19]

Schnürle et al.

[11] 4,335,696
[45] Jun. 22, 1982

[54] METHOD AND APPARATUS FOR PERFORMING FUEL MIXTURE ENRICHMENT

[75] Inventors: Hans Schnürle, Walheim; Michael Horbelt, Schwieberdingen; Ulrich Drews, Vaihingen-Pulverdingen; Peter Werner, Stuttgart-Neugereut; Otto Glöckler, Renningen; Dieter Günther, Ludwigsburg-Pflugfelden; Richard Bertsch, Asperg, all of Fed. Rep. of Germany

[73] Assignee: Robert Bosch GmbH, Stuttgart, Fed. Rep. of Germany

[21] Appl. No.: 165,920

[22] Filed: Jul. 3, 1980

Related U.S. Application Data

[63] Continuation of Ser. No. 866,878, Jan. 4, 1978, abandoned.

[30] Foreign Application Priority Data

Jan. 20, 1977 [DE] Fed. Rep. of Germany ....... 2702184

[51] Int. Cl.³ .............................................. F02M 51/02
[52] U.S. Cl. ..................................... 123/492; 123/493
[58] Field of Search ...................... 123/492, 493, 494

[56] References Cited

U.S. PATENT DOCUMENTS

| | | | |
|---|---|---|---|
| 3,570,460 | 3/1971 | Rabus | 123/493 |
| 3,673,989 | 7/1972 | Aono et al. | 123/492 |
| 3,703,162 | 11/1972 | Aono | 123/493 |
| 3,759,231 | 9/1973 | Endo | 123/492 |
| 3,823,696 | 7/1974 | Mutschler et al. | 123/483 |
| 3,919,981 | 11/1975 | Reddy | 123/492 |
| 4,015,563 | 4/1977 | Drews et al. | 123/492 |
| 4,051,818 | 10/1977 | Volckers | 123/492 |
| 4,126,107 | 11/1978 | Harada et al. | 123/492 |
| 4,127,086 | 11/1978 | Harada et al. | 123/493 |
| 4,227,507 | 10/1980 | Takace et al. | 123/492 |

*Primary Examiner*—Tony M. Argenbright
*Attorney, Agent, or Firm*—Edwin E. Greigg

[57] ABSTRACT

There is described a method and an apparatus for use with the fuel preparation system of an internal combustion engine, for example, a fuel injection system which operates injection valves with electrical control pulses. When the gas pedal of a vehicle is actuated abruptly, the air flow measuring device of such systems is subject to oscillations around its equilibrium point, and the initial one of these swings is used to cause enrichment of the fuel-air mixture. The return swing generates an undesired lean signal which is suppressed by a "damping circuit". In addition, there is provided mixture enriching during steady applications of the gas pedal by means of a time-decaying enrichment signal generated by a slow acting circuit which operates in superposition to the action of the damping circuit. Both circuits may be suppressed by a blocking circuit during certain engine conditions, for example, during engine starting and engine overrunning as well as on the basis of temperature.

21 Claims, 7 Drawing Figures

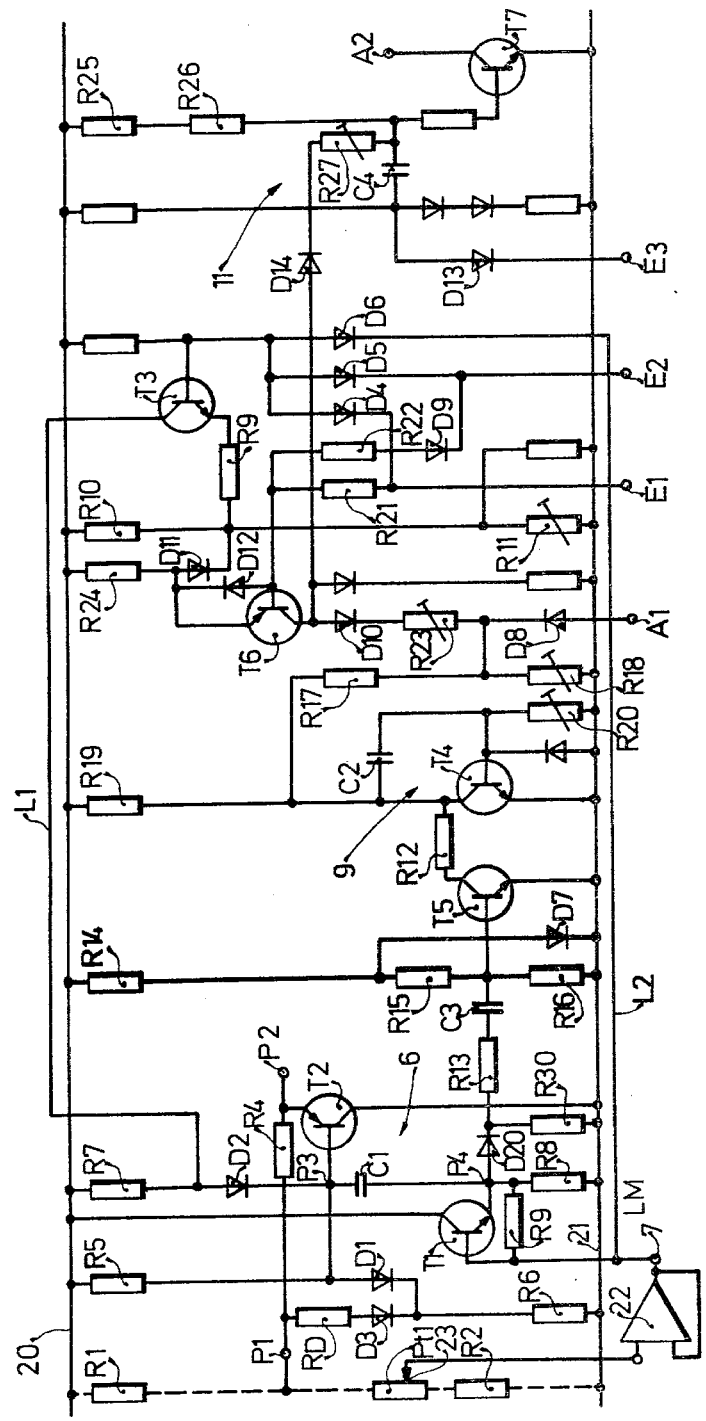

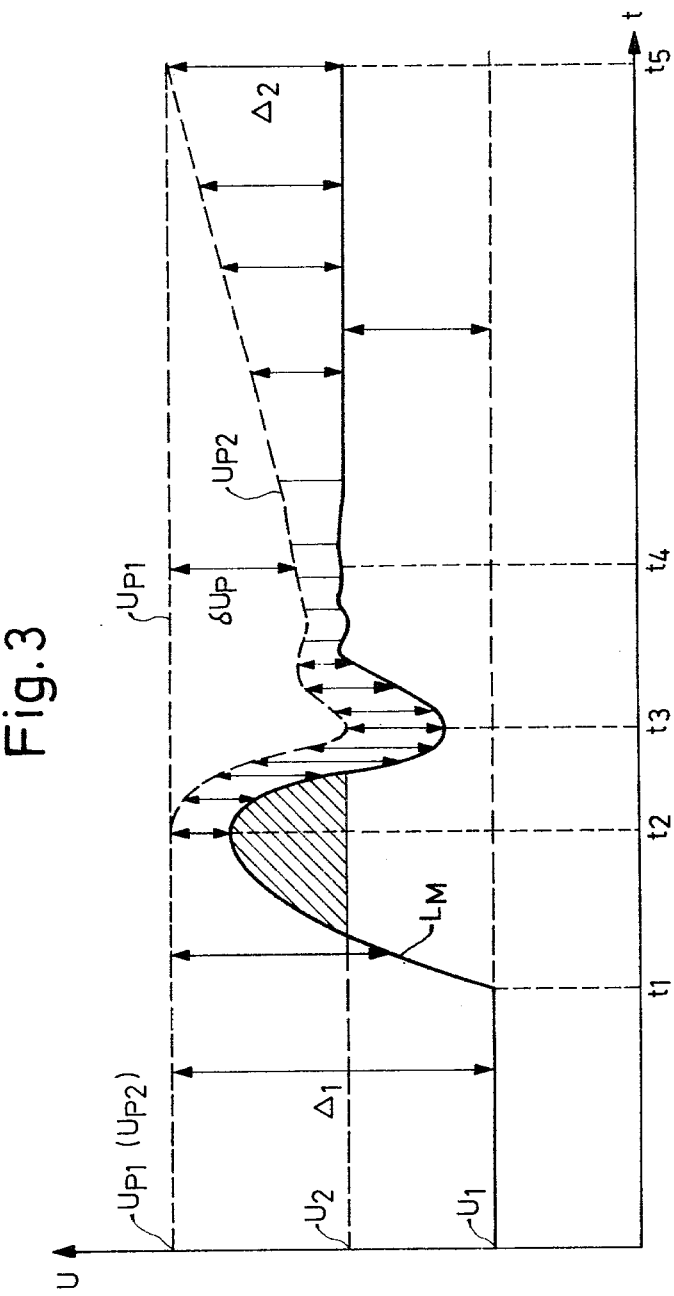

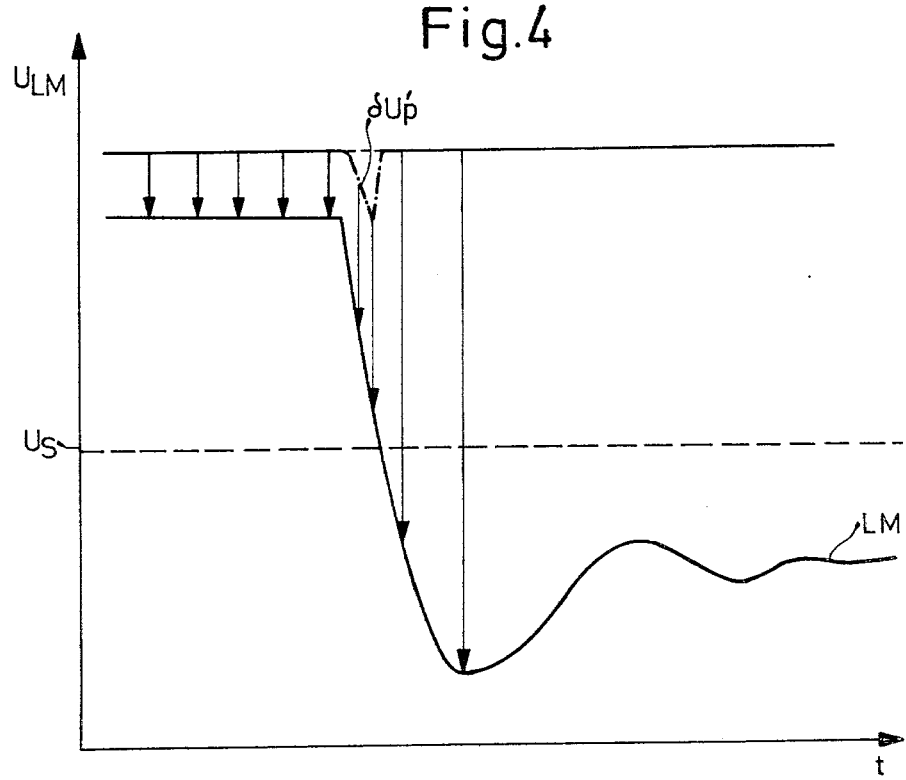
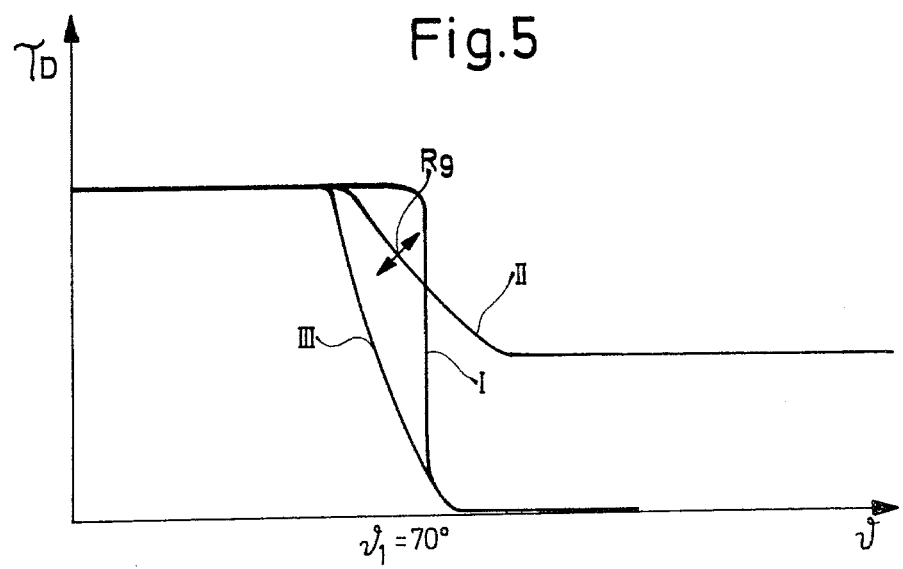

METHOD AND APPARATUS FOR PERFORMING FUEL MIXTURE ENRICHMENT

This is a Continuation, of applicaton Ser. No. 866,878 filed Jan. 4, 1978, now abandoned.

BACKGROUND OF THE INVENTION

The invention relates to the control of the fuel supply for an internal combustion engine. More particularly, the invention relates to a method and an apparatus for engaging an existing fuel preparation system in an internal combustion engine so as to provide fuel mixture enrichment for an intended acceleration of the engine. In known fuel preparation systems, for example in fuel injection systems, there may be present an air flow rate meter disposed within the induction manifold of the engine which generates a, usually electrical, signal that is a measure of the position, i.e. the opening, of the throttle plate and hence a measure of the air flow rate into the engine. However, inasmuch as carburetors or other fuel preparation systems also measure the air flow rate directly or indirectly, the method and apparatus of the invention would, in principle, be suitable for use in association therewith. When the operator depresses the gas pedal rapidly, the air flow rate metering flap of the known fuel injection system tends to move quite far in the direction indicating a full-load, i.e. fully opened throttle, and then subsequently swings back again while being damped to a relatively small degree. During the return swing of the air flow rate meter, the system indicates a relatively low load condition which is incorrect and which is less than the actual load of the engine, i.e. less than the actual opening of the induction tube throttle and hence does not correspond to the air flow rate actually admitted to the engine. Any fuel control measures, for example fuel injection control pulses which are based on the indications of the air flap during its return swing, will thus be too small or too short and will result in providing to the motor an insufficient amount of fuel. This type of condition may cause a delay in the acceleration in spite of rapid gas pedal actuation and may, in fact, cause the engine to stall. It is also possible for explosions to occur in the induction manifold.

It should be noted that the first excursion of the baffle plate within the air flow rate meter subsequent to an accelerating motion of the gas pedal is generally desirable because it results in an excessive amount of fuel being delivered to the engine during a rapid acceleration. Unfortunately, this initial enrichment is effective for only a short time and thus can affect only those fuel injection pulses which occur prior to the return swing of the baffle plate.

OBJECT AND SUMMARY OF THE INVENTION

It is thus a principal object of the invention to provide a method and an apparatus for changing the output response of the air flow rate meter to cause a decaying, extended signal. Thus the required initial enrichment is maintained for a longer period of time than would be the case in the known system and, furthermore, the effect of the return swing of the air flow rate meter is completely suppressed. It is a further object of the invention to provide a method and an apparatus for so engaging the enrichment mechanism as to prevent the prolongation of enrichment when various conditions occur, for example when the engine is cold, i.e. during starting, and during engine overrunning. These and other objects are attained according to the invention by providing a method and apparatus for processing a signal from an air flow rate meter disposed within the induction tube so as to generate an output signal which is substantially independent of the mechanical return swing of the air flow rate baffle. Another circuit causes a decreasing enrichment of the fuel-air mixture after an initial sharp excursion of the air flow rate baffle. Another object of the invention is to provide for smoothing of the electrical signal from the air-flow rate meter by appropriate circuitry. Additionally, the invention provides that any acceleration, even a relatively slow actuation of the gas pedal, is translated into a decaying enrichment depending on the slope and amplitude of the air flow rate signal.

When the engine enters an overrunning condition (negative torque), the invention provides that the enrichment is suppressed by appropriate comparison with a threshold signal.

The circuit which produces a time decaying enrichment during slow gas pedal actuation causes a differentiation of the air flow rate signal which is appropriately used to suppress the action of the circuit which interprets the occurrence of an excessive return swing of the air flow rate meter (which does not take place during slow gas pedal actuation). The slow-actuation enrichment signal is fed, for example, to the dividing control multivibrator in the fuel injection system if such is used to supply the engine with fuel.

The invention will be better understood as well as further objects and advantages thereof become more apparent from the ensuing detailed description of a preferred embodiment taken in conjunction with the drawing.

BRIEF DESCRIPTION OF THE DRAWING

FIG. 2 is a detailed circuit diagram illustrating the electronic components contained within the block diagrams of FIG. 1; and FIGS. 3-6b are block diagrams illustrating the function and operation of the acceleration enrichment circuit according to the present invention.

DESCRIPTION OF THE PREFERRED EMBODIMENT

Figure 1:
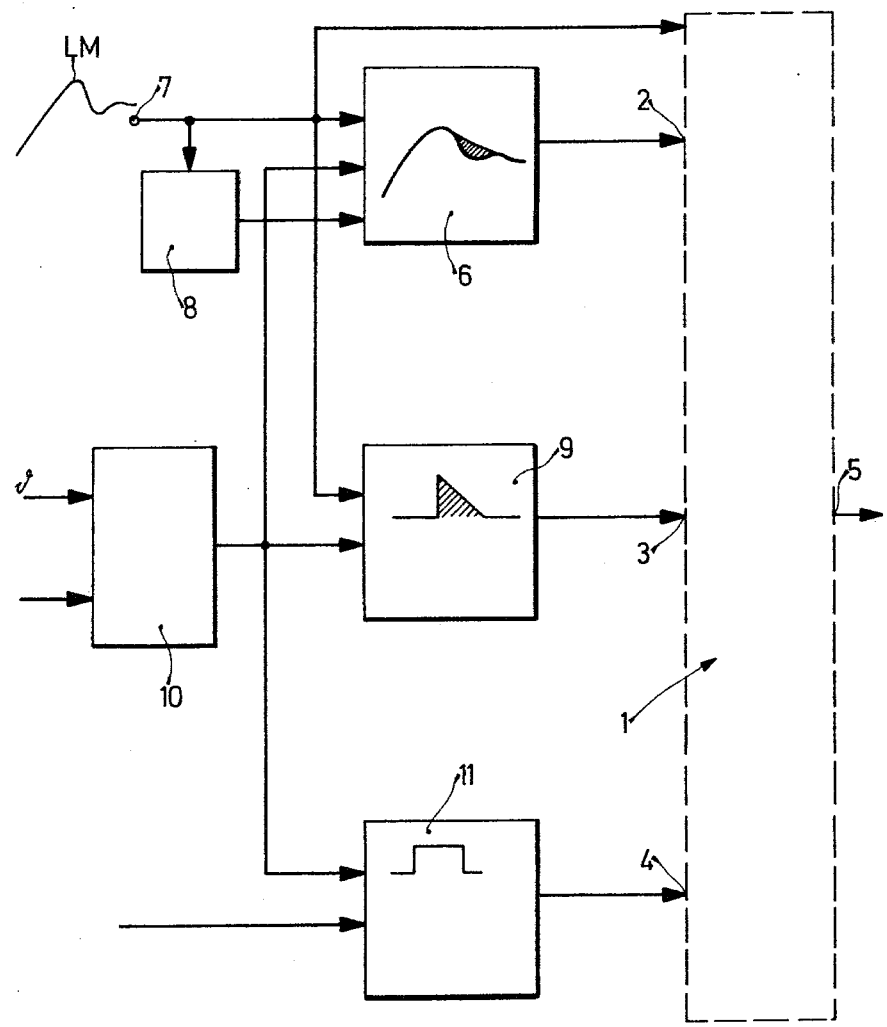
FIG. 1 is a schematic block diagram illustrating the major functional portions of the invention.

The basic design and construction of the apparatus according to the invention and the method employed in the invention are illustrated in FIG. 1. As already explained, it is a basic object of the invention to provide enrichment of the fuel-air mixture, particularly in the accelerating phase of the engine, i.e. when the vehicle operator actuates the gas pedal. This enrichment may be subject to various modifying conditions, for example it may be suppressed during engine starting, on the basis of temperature, as well as during engine overrunning. These peripheral conditions can be used to engage the enrichment to varying degrees by changing the maximum pulse duration of the fuel control pulses fed to, for example electromagnetic fuel injection valves.

It should be carefully noted at this point that the fuel preparation system in connection with which this present invention is discussed herein is only an exemplary embodiment and that the invention may be used as well in connection with other fuel preparation systems, for example continuous injection systems or carburetors. The essential characteristic of the present invention is to provide control signals which are delivered to the fuel preparation system to cause it to perform an enrichment of the fuel-air mixture subject to possible other conditions. Thus, while the invention will be discussed in detail in association with an intermittently operating electrical fuel injection system, this exemplary association should in no way be regarded as a limitation to such a particular system.

Turning now to FIG. 1, there will be seen a block 1 which designates generally a processor circuit having inputs 2, 3 and 4 at which it receives various analog signals that are used in a manner to be discussed below. At the point 5, the processor circuit 1 generates an output signal which is fed to suitable circuitry that generates valve control pulses to be used in the fuel injection system. The circuitry to which the output pulses from the point 5 are delivered may be, for example, an electronic fuel injection system, in particular it may be the so-called L-Jetronic fuel injection system which includes a so-called multiplier circuit or pulse length modifying circuit which receives fuel control pulses "tp" and generates therefrom injection valve actuation pulses "ti", while processing various external correcting signals. System generating fuel injection pulses and being dependent on throttle valve position are described in U.S. Pat. Nos. 3,898,962 and 2,936,744.

Generally speaking, the apparatus according to the present invention serves to improve the fuel combustion in the accelerating phase of an internal combustion engine. The engine includes an air flow rate metering device having, for example, a baffle plate which generates a signal substantially corresponding to the actual air flow rate when in equilibrium. If the baffle plate is not mechanically damped to any severe degree, it will not produce an absolutely proportional signal. For example, during rapid gas pedal actuation, the baffle plate will tend to oscillate beyond the correct position in the direction of high load and subsequently undergo a return motion beyond the correct value into the region of low load. Depending on the damping of the baffle plate, the output signal will oscillate around the correct value for some time. Neither of the extreme positions of the baffle plate during oscillation corresponds to the aspirated air flow rate. For this reason there is provided a linearizing or damping circuit 6 which smoothes the air flow rate signal LM in a particular manner. Associated with the damping circuit 6 is a blocking circuit 8 which insures that when the gas pedal is entirely released, the resulting change in the LM signal will not be erroneously interpreted by the damping circuit as merely an oscillation to be compensated. The circuit 8 may thus be referred to as an overrunning blocking circuit. It is generally desired during gas pedal actuation that the fuel mixture be enriched so as to prevent uneven acceleration. For this purpose, there is provided an accelerating enrichment circuit 9 which causes a fuel enrichment with decaying characteristics and this circuit is effective regardless of the rapidity of gas pedal actuation. When the gas pedal is actuated only slowly and evenly, the baffle plate, which acts as an air flow rate meter, does not tend to move past its correct position so that the damping circuit 6 would have no effect on the output signal LM.

It may be desired to use the damping circuit 6 and the enrichment circuit 9, both of which substantially result in mixture enrichment, only during certain operational states of the engine, for example when the engine is cold. There is accordingly provided a supplementary circuit 10 which receives a temperature-dependent signal and which engages the damping circuit 6 as well as the enrichment circuit 9 to cause a temperature-dependence of the enrichment factor at the same time as suppressing the effect of the circuits 6 and 9 during engine starting.

Finally, there is provided a circuit 11 which limits the maximum duration of the fuel injection control pulse and this limiting circuit 11 also acts in temperature-dependent manner, i.e. under the control of the temperature correction circuit 10 in the sense of reducing the pulse prolongation with increasing engine temperature.

The apparatus of the invention, which may be referred to as an acceleration enrichment circuit, thus performs the following separate functions:

1. The maximum control pulse duration is increased, i.e. the fuel-air mixture is enriched in the domain of acceleration, while the pulse limiting circuit 11 limits the pulse prolongation to a value below a maximum.

2. The LM output signal of the air flow rate meter is suitably damped and is further processed to cause the damped LM signal to indicate an enrichment for subsequent circuit components.

3. There is undertaken a time dependently decreasing enrichment which is effective even when the gas pedal is actuated slowly and which operates in addition to the enrichment performed by the damping circuit.

4. The entire enrichment process taking place during engine acceleration is subjected to a temperature dependence.

5. The enrichment process is suppressed during engine starting.

6. The enrichment process is suppressed in overrunning (downhill) operation.

The electronic circuitry according to the present invention for performing the functions enumerated above will now be further discussed with reference to FIG. 2. It should be noted however that the various parts of the circuit which perform the different functions may also be used independently of the others to produce a desired effect and should thus be considered independent inventions which may be combined in the manner shown to control the operation of an internal combustion engine very efficiently in the domain of acceleration.

The first major components in the circuit of FIG. 2 are those relating to the block diagram 6 of FIG. 1, i.e. the damping circuit. This damping circuit has an input 7 which receives the output signal LM of the air flow rate meter in its original shape. A further input P1 of the damping circuit is placed at a predetermined positive potential while the effective output P2 of the circuit P2 generates a correction signal which is used by subsequent circuitry, not further described, in conjunction with the LM signal. The basic air flow rate signal LM may be generated, for example, by a potentiometer Pt1 connected in series with a voltage divider R1 and R2 that is placed across the positive power line 20 and the negative power line 21. The junction of the resistor R1 and one contact of the potentiometer Pt1 constitutes the point P1 of the damping circuit 6 and carries a positive potential of a magnitude determined by the dimensions of the components of the voltage divider. The wiper 23 of the potentiometer Pt1 may be moved, for example by the moving baffle plate of an air flow rate meter, so that it carries a changing signal with respect to the point P1 and this signal is used by subsequent circuitry as the basic air flow rate signal. Thus the basic air flow rate signal LM is the potential difference between the point P1 and the wiper of the potentiometer Pt1 and the negative voltage at the wiper moves toward a more positive constant value and this movement is measured and used. It will be assumed in this example that the smaller this differential voltage is, the larger is the opening of the baffle plate, i.e. the more air is aspirated by the engine and the greater is the load on the engine. Thus a small signal LM relative to the point P1 means high engine load, while a large potential difference between the wiper of the potentiometer or, possibly, the output of an impedance converter 22, corresponds to a low engine load. The impedance converter 22 may be provided so as to make the wiper voltage of the voltage divider insensitive to circuit loads.

The damping circuit generates its correction signal for damping the air flow rate meter signal in the following way. There is provided a capacitor C1 which may be charged and discharged via one of two paths, the first being a low impedance path and the second being a high impedance path. These are connected in such a way that the potential at the capacitor follows the air flow rate signal LM when the load increases, i.e. when the voltage difference between the points P1 and the input 7 decreases, whereas, when the signal LM swings in the opposite direction, the potential at the capacitor C1 is also pulled down and this potential is equal to that at the point P1 but transposed to the output contact P2. In this manner, the differential voltage may be held constant. Of course the subsequent circuit no longer receives the unchanging positive constant voltage at the point P1 but rather the newly generated correction signal which changes in the desired manner along with the actual air flow rate signal LM at the point P2. The voltages occurring at the various points of this circuit are illustrated in FIG. 3 and will now be explained. Let it be assumed that the engine operation is steady up to a time t1 while the air flow rate signal LM has a constant value U1. The differential voltage to the positive constant potential of the point P1 is labeled $\Delta 1$. This implies that when the differential voltage $\Delta 1$ is large, the engine load is low. Let it be assumed now that at the point t1 the operator causes a rapid actuation of the gas pedal, so that the baffle plate of the air flow rate meter undergoes a large excursion in the direction of full-load beyond the correct point, i.e. beyond that point which would correspond to the actual air flow rate. Thus the signal LM is much larger than the actual air flow rate so that the subsequent circuitry reacts with a transient enrichment, for example in the part of the curve which is shown shaded. When a fuel injection system is being used, this activity results in a pronounced prolongation of the injection pulses which may be desired because it generally contributes to improved accelerating behavior of the engine.

However, the baffle plate does not remain at its overextended position but returns in the opposite direction between the times t2 and t3 and may well return beyond the point corresponding to the actual air flow rate in the direction of less air and lower load. Thus the fuel injection control pulses based on the baffle plate position in this state will be too short and the motor will receive too little fuel, therefore the motor will accelerate only slowly and hesitatingly and may even stall. It is possible also for explosions to occur in the induction manifold.

Due to the basic damping of the baffle plate, the oscillations gradually decrease in magnitude and the amplitude approaches the new steady-state value corresponding to the output value U2. There is then obtained a new differential voltage between the signal LM and the voltage $U_{P1}$ which is labeled $\Delta 2$ and it occurs at the circuit point P1. It is an important characteristic of the present invention that the correction performed by the damping circuit 6 causes the voltage at the point P2 to follow the changes of the air flow rate signal LM in the manner indicated by the dashed line labeled $U_{P2}$. This curve is seen to depart from the constant value $U_{P1}$ at the time t2 than follows the fluctuations of the signal LM up to approximately the time t4 after which it gradually increases to a time t5 at which it has resumed substantially its original value so that the separate branches $U_{P1}$ and $U_{P2}$ rejoin at this point. The differential voltage between these two branches occurs across the resistor R4 and is labeled $\delta U_P$ in FIG. 3. The differential voltage which is processed by the subsequent circuitry is the differential voltage indicated by the double pointed arrows which ranges from $\Delta 1$ to $\Delta 2$. By carrying along the voltage at the output point P2, the excess oscillation which corresponds to a minimum differential amplitude of the voltage to be processed at the point t2 is maintained and is prolonged in a time decaying manner which completely covers up the fact that the basic signal LM undergoes an oscillation in the opposite direction. In this manner, the transient enrichment due to the primary excursion of the baffle plate is maintained in a desired manner and is continued and permitted to decay after a period of time subject to design considerations. Therefore, a very excellent adaptation of the output signal to the desired accelerating enrichment is obtained. The curves illustrated in FIG. 3 which represent the voltages generated by the circuit 6 are obtained by the controlled charging and discharging of the capacitor C1 which is located in the emitter circuit of an emitter follower transistor T1 whose emitter is connected through a resistor R8 to the ground or negative line 21. The transistor T1 is controlled by the output voltage of the air flow rate transducer, i.e. by the wiper 23 of the potentiometer Pt1, possibly via the impedance converter 22. The other contact of the capacitor C1 is connected to a circuit point P3 which will acquire the same potential as the point P1 provided that the conducting voltage drops of the diodes D1 and D3 are equal. Connected to the point P3 is further the base of an emitter-follower transistor T2 whose emitter represents the circuit point P2, i.e. the output of the damping circuit 6. A further control signal, whose origins will not now be discussed, can also be fed to the point P3 from a different part of the circuit via the diode D2 and the line L1. Let it be assumed for the following discussion that the diode D2 blocks. Connected to the point P3 is a resistor R5 leading to the positive supply line 20 and the resistor R5 is assumed to be of relatively high resistance whereas a resistor R6 leads from the junction, i.e. the cathodes, of the diodes D1 and D3, to the negative supply line 21 and is assumed to be of very low resistance relative to the magnitude of resistor R5. A resistor $R_D$ may be connected between the diode D3 and the point P1. The function of the damping circuit 6 as described above is as follows:

If the voltage at the input 7 increases between the time t1 and t2, the emitter-follower circuit or transistor T1 and the low impedance voltage branch consisting of the diode D1 and the resistor R6 changes the charge on the capacitor C1 so that the voltage at that electrode of the capacitor connected to the emitter of the transistor T1 practically follows the variations of the air flow rate signal LM, whereas the other electrode of the capacitor which is connected to the point P3 does not alter its potential due to the presence of the low impedance path R6. The voltage on the capacitor may change substantially during this process and the current flowing during that time passes through the diode D1 and the resistor R6 in an amount of time which is so short as to be negligible. Inasmuch as the voltage at the point P3 does not change, the voltage at the point P2 also remains unchanged during a positive increase of the voltage at the input of the transistor T1, assumed to take place up to the time t2 in FIG. 3. However, when the voltage at the input 7 drops toward more negative values during the return swing of the air flow rate meter signal LM, the diode D1 blocks and prohibits the flow of the capacitor recharging current which would have to flow in the opposite direction. Therefore, the changing emitter voltage of the transistor T1 forces the voltage at the point P3 to go along for a practically constant voltage across the capacitor because the capacitor C1 cannot change its charge or can change it only very slowly via the high impedance resistor R5 or by using the base current of the transistor T2. Therefore, the voltage at the point P2 is extended and the above-mentioned voltage drop $\delta U_P$ is formed across the resistor R4. This behavior already corresponds to the desired function; in a particular exemplary embodiment, the time constant for the high impedance path of the capacitor C1 which provides a slow adaptation to the new steady state value was assumed to be about one or two seconds whereas the time constant for the capacitor charge-exchange was calculated to be 20 ms.

The purpose of the diode D3 connected from the point P1 to the junction of the diode D1 and the resistor R6 is, firstly, to shut off the basic damping circuit when the system has achieved a state of equilibrium. This happens because the basically comparable conduction potentials across the diodes D1 and D3 cause the point P3 and hence the base of the transistor T2 to assume essentially the voltage at the point P1 under steady-state conditions so that the transistor T2 is blocked and the voltage $U_{P1}$ equals the voltage $U_{P2}$. Secondly, it is the purpose of the diode D3 to adjust the sensitivity of the damping circuit 6 to voltage fluctuations in the air flow rate signal LM. It may be assumed, in principle, that the voltage fluctuations at the emitter of the transistor T1 must be larger than the base-emitter conduction potential of the transistor T2 which must therefore first be overcome before any change of the voltage at the output point P2 can take place. It is a particular advantage of this damping circuit that it definitely will not influence the system if the air flow rate signal LM is stationary, i.e. steady state, so that it will not respond to voltage fluctuations due to a changing supply voltage, or due to pulsating air currents in the induction manifold or some other voltage fluctuations, at least not as long as these voltage fluctuations remain below a threshold, for example 300 mV and this threshold is determined by the mutual values of the conduction voltages of the diodes D1 and D2 and of the base-emitter conduction potential of the transistor T2 if the resistor $R_D$ is equal to zero. However this resistor may be made some other value with respect to the resistor R6 and such a choice may determine the magnitude of voltage fluctuations to which the circuit will respond.

The functioning of the transistor T1 and hence of the overall damping circuit 6 is further influeneced by the presence of the resistor R8 between the emitter and ground as well as by the resistor R9 which connects the emitter of the transistor T1 with its base. The resistor R8 receives the current which is generated by the recharging process of the capacitor C1 when the LM signal oscillates below the nominal value and this current also flows through the resistor R5. For this reason, the value of the resistor R8 must be small enough for this current to flow because it is unable to flow into the emitter of the transistor T1. By making the value of the resistor R8 higher, it is possible to change the reaction of the system to a below-normal oscillation of the LM signal and thus to change the sensitivity of the circuit to variations in the air flow signal LM. This sensitivity may also be changed by the resistor R9 which is intended to be of a high value and may in fact be left out. The transistor T1 can be made active only if the potential across the resistor R9 is greater than the base-emitter voltage.

Before proceeding to the discussion of the next circuit portion which includes a Miller integrator which also causes fuel enrichment during accelerations and especially during slow acceleration where the accelerating signal from the damping circuit 6 is unusable, there will now be explained various possibilities in which the transistor T3 may be controlled to change the manner of operation of the damping circuit 6. The base of the transistor T3 receives signals via diodes D4, D5 and D6, respectively. These diodes constitute an OR circuit and the diode D4 receives a temperature-dependent signal from the input E1 which may, for example, be obtained with the aid of an NTC resistor, the diode D5 is connected to the input E2 and receives therefrom a signal related to the starting condition of the engine while the diode D6 transmits the air flow rate signal LM directly via a line L2. The emitter of the transistor T3 is connected via a resistor R9 to the junction of voltage divider resistors R10 and R11 and therefore is placed at a predetermined potential. The collector of T3 is connected via the line L1 to the junction of the diode D2 and the resistor R7 within the damping circuit 6. The value of the resistor R7 is chosen relatively low and when the damping circuit 6 operates properly, i.e. when the engine is cold and during normal engine operation, the diode D2 is blocked and the transistor T3 conducts because the anode of D2 carries a potential received via the collector-emitter path of the transistor T3 which is more negative than that normally present at the point P3. However, if the transistor T3 blocks, for example because it receives a suitable negative voltage via diodes D4, D5 or D6, then the current path through R7 and D2 is open and the very low value resistor R7 is connected in parallel with the high value resistor R5 with the consequence that the voltage at the point P3 is substantially retained and no longer follows the changes taking place at the emitter of the transistor T1. In this manner, the damping circuit 6 is partially or completely defeated, depending on the degree of blockage of the transistor T3 and the concurrent opening of the low impedance path through R7. This will be the case when the motor is sufficiently warmed up because, in that case, the input U1 will have a suitable negative temperature signal. It will also be the case when the engine is being started, for then the input E2 will carry a corresponding negative control signal generated in any suitable manner or, again, if the third possibility of blockage due to engine overrunning (downhill operation) takes place. In the latter case, i.e. when the gas pedal is completely released, the air flow rate signal LM drops to a very low value as shown in FIG. 4 and as taken from the wiper 23 of the potentiometer Pt1. This value is below a threshold voltage $U_s$ so that the diode D6 becomes conducting and the transistor T3 blocks the damping circuit 6 in the manner described above. While the damping circuit attempts to respond to the backward oscillation of the air flow signal LM in its usual manner, resulting in the small voltage peak $\delta U_p'$ of FIG. 4, it soon returns to its positive constant potential level when the threshold voltage $U_s$ has traversed in the downward direction and the transistor T3 blocks causing the opening of the low impedance current path through R7 and D2. After the peak $\delta U_p'$ is passed, the voltage assumed then substantially corresponds again to the voltage at the point P1 or at the output P2 of the damping circuit 6. Any further oscillations of the baffle plate and subsequent oscillations of the air flow rate signal LM which may take place after the signal LM has passed below the threshold voltage $U_s$ have no influence on the circuit because the transistor T3 remains blocked. The same thing happens when gears are being shifted and no enrichment of the mixture takes place in that case. The magnitude of the threshold voltage $U_s$ may be adjusted by the resistor R11 so that the occurrence of the downhill blockage can be adjusted. The same adjustment is effective for the temperature signal. The engagement of the circuit may be abrupt, i.e. after the passage of a specific threshold, or the transistor T3 may be slowly brought to blockage, thereby causing the damping circuit to become ineffective more slowly as the engine temperature increases.

FIG. 5 is a diagram illustrating the time constant $\tau_D$ of the effect of engagement or blockage of the damping circuit as a function of engine temperature. As may be seen, there are various ways of influencing the circuit, for example the damping circuit may be switched off very abruptly according to the curve I from a maximum effectiveness to zero effectiveness at a particular engine temperature $\theta_1$, for example 70° C. However, it is also possible to produce a more gradual decrease of the damping circuit effectiveness, for example according to the curve II, to another time constant and the rapidity of the transition between the two time constants is affected by the value of the resistor R9. Finally, it is also possible to produce a very gradual decrease until the time constant has the value 0 according to the curve III, whereby, after a predetermined temperature is reached, the damping circuit 6 has no effect on the computation or magnitude of the fuel quantity fed to the engine.

As discussed previously, the fuel-air mixture fed to the engine may be further enriched by another circuit 9 which causes a decaying enrichment but one which is always effective and which is thus superimposed on the effect of the circuit 6 which takes place only for rapid gas pedal actuation. Thus, when the gas pedal is being actuated slowly and the air flow rate meter may be assumed not to oscillate between two extrema, this circuit 9 alone takes care of any necessary mixture enrichment. The circuit 9 includes a Miller integrator consisting of a transistor T4 and a feedback capacitor C2, the integrator being controlled by a transistor T5 via a resistor R12. In those parts of engine operation which are relevant here, the emitter-follower transistor T1 will always be active so that the point P4 at the emitter of the transistor T1 will carry the air flow rate signal LM which goes via a resistor R13 to a differentiating circuit, consisting here of the transistor T5 having a base voltage divider consisting of resistors R14, R15 and R16 and a diode D7 connected from R15 to ground. A base control capacitor C3 is also provided. Normally, the transistor T5 is blocked but it is caused to conduct by a positive control pulse of the air flow signal LM which causes the collector of the transistor T5 to be substantially grounded as is one electrode of the capacitor C2 via the resistor R12. The effect is then carried through resistors R17 and R18 connected to the collector of T4 and through the diode D8 which is then conducting to the mixture-preparing portions of the circuit. In the specific case where a fuel injection system is used, the resistors R18 and R17 are connected in parallel with the charging resistor of a control multivibrator which is itself connected to ground so that an increased charging current will flow into the timing capacitor of the control multivibrator and, depending on the time constant of the Miller integrator, thereby initiating a definite increase of the length of the fuel control pulses and hence causing fuel enrichment. In any case, the output signal A1 of the circuit is used to cause a time-decaying enrichment by means of a signal which goes from a negative potential in the direction of a more positive value in linear fashion. After this correction, the collector potential of the transistor T4 gradually increases again so that this enrichment becomes ineffective with increasing time. The decreasing enrichment as a function of time is especially desired because it improves the drivability of the vehicle when the engine is relatively cold. The dimensions of the resistors R15 and R16 make it possible to set the voltage of the base of the transistor T5 below conduction, i.e. they permit a setting of the amount of voltage which the air signal LM must provide so as to cause the time-dependent enrichment due to the circuit 9. Similar considerations apply to the slope of the change in the air flow rate signal which must also reach a predetermined value because, if it is too slow, the capacitor C3 in the base circuit of the transistor T5 is able to follow the voltages which are present at its electrodes.

These various circumstances depend on the dimensions of the circuit elements in the base circuit of the transistor T5. The further components and function of the timing circuit 9 need not be discussed in detail because they refer to a known modular circuit including the transistor T4 and a collector resistor R19, an integrating capacitor C2 and a base drain resistor R20 which may be adjustable. The entire operation of the circuit 9 which causes the time-dependent decaying enrichment may, if desired, be made subject to the influence of further operational variables, for example conditions such as engine starting, downhill operation and engine temperature, either totally or only to the degree of occurrence of these variables. In the circuit shown, there is provided a further transistor T6 whose base receives the engine temperature signal via a resistor R21 while it receives the engine starting signal from the input E2 via a resistor R22 and a diode D9. The emitter of the transistor T6 is connected to the positive supply line 20 via the resistor R24 and via a diode D11 to the emitter resistor R9 of the transistor T3. The base and the emitter of the transistor T6 are joined via a diode D12. When the enrichment circuit 9 is expected to be operating, i.e. when the engine is sufficiently cold and it is not being started, the transistor T6 will be blocked and no effect takes place via the diode D10 and the adjustable resistor R23 into the collector circuit of the transistor T6. The engine starting signal may be so chosen as to cause the transistor T6 to be abruptly conducting so that the collector current flowing through the resistor R18 increases the voltage drop thereon sufficiently to block the diode D8. The temperature signal may be preferably provided such that the current through the transistor T6 increases with increasing temperature and is subtracted from the current flowing through the diode D8 when the enrichment circuit 9 is fully effective. The state of conduction of the transistor T6 is also determined by the threshold defined by the voltage divider R10, R11. Basically, the resistor R18 is affected in the same way by one of two things, i.e. the collector potential of the transistor T4 in the Miller integrator and the increasing collector voltage of the transistor T6 due to increasing temperature. The increase of the output potential of the integrator causes the same time-dependent decay via the diode D8 as takes place via the transistor T6 when it is becoming increasingly conducting due to increasing engine temperature. If the resistor R23 is suitably dimensioned, it is also possible to maintain a small aount of time-dependent enrichment even when the engine temperature has become normal. The overall reason for the temperature-dependent control is the adaptation of engine operation to a desired exhaust gas composition in view of the environmental requirements.

Due to the function of the circuit of the invention and its various components, the fuel preparation system is able to generate substantially longer control pulses and is thus able to provide to the engine substantially more fuel during acceleration. This behavior is produced by processing the changes of the air flow rate signal LM due basically to the normal oscillatory motions of the air flow rate meter and by the use of the normal time-dependent decaying enrichment provided by the circuit 9. Inasmuch as the pulse lengths are now increased, it is desirable to provide a limit for the increase thus obtained and this limit is defined by the pulse limiting circuit 11 which is optional.

The pulse limiting circuit 11 includes a monostable multivibrator, embodied as a so-called economy flip-flop, and its input E3 is controlled by a suitable pulse train which is synchronous with th fuel injection control pulses. The pulse train used is the so-called triggering pulse train whose negative-going edges cause the transistor T7 to be blocked via the diode D13 and the capacitor C4. The pulses are sufficiently far apart so that a suitable dimensioning of the discharge resistor R25 in series with a further resistor R26 permits adjustment of the discharging times of the capacitor C4. After being triggered by the triggering pulse, the transistor T7 returns to its conducting state at which time the pulse at its collector, which is used by the further circuitry, is grounded toward the line 21 and defines the limit of pulse duration. The essence of this circuit is that discharging times or the recharging time of the capacitor C4 may also be influenced via the diode D14 and the adjustable resistor R27 by the collector of the transistor T6 which is part of the previously discussed temperature control circuit. Any such influence however can only cause to shorten the control pulse and if the transistor T6 conducts, the influence of the accelerating enrichment is either completely defeated or is diminished so that under those conditions when the transistor T6 conducts, the pulse limiting circuit 11 defines a normal maximum pulse.

Figure 6A:
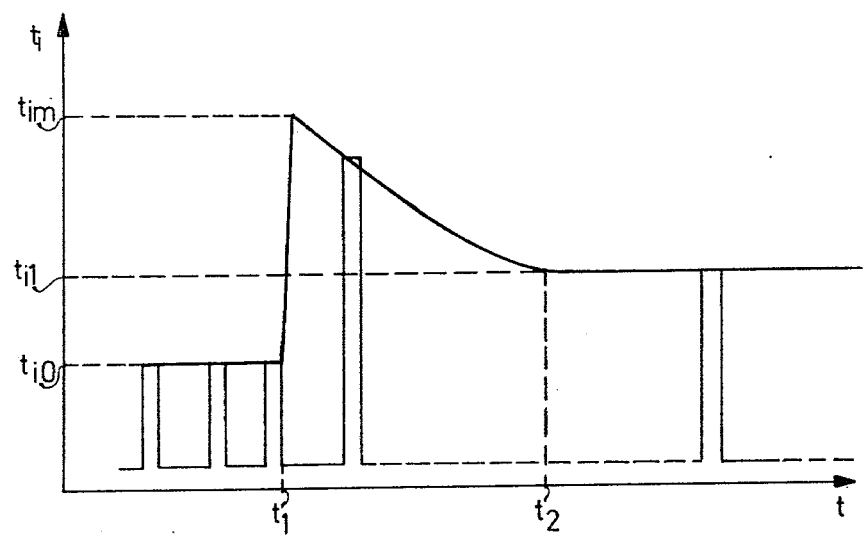
Figure 6B:
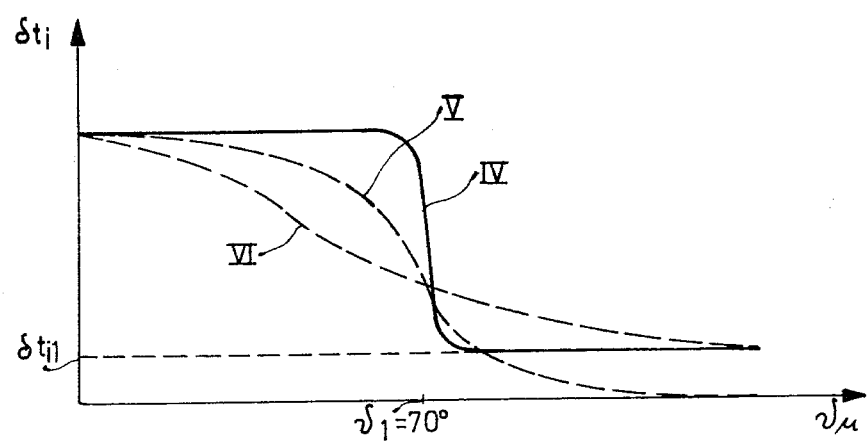

The various portions of the circuit of the invention and their function are better understood with the aid of FIGS. 6a and 6b which illustrate the possible effects of these circuits in the formation of the final control pulse for electromagnetic fuel control valves for the case that an electrical fuel injection system is being used. FIG. 6a is a diagram showing the magnitude of the fuel control pulses ti as a function of time. At the time t1 the vehicle operator is assumed to actuate the gas pedal to initiate an acceleration of the engine. Up to that time t1, the injection pulses have a magnitude $ti_o$ which is increased to its maximum value $ti_m$ due to the excessive excursion of the air flow rate baffle as discussed above and/or due to the enrichment from the circuit 9 in time-decaying manner. Only when the time t2 is reached is the size of the fuel injection control pulses equal to the value which is proper for normal operation corresponding to the air flow rate and has assumed the value $ti_1$.

FIG. 6b illustrates that the additional fuel enrichment $\delta ti$ exhibits a dependency on the engine temperature $\theta_M$. This dependency may be that according to the curve IV, i.e. that at a temperature $\theta_1$ the additional fuel injection time $\delta ti$ is lowered with steep slope to a new constant value $\delta ti_1$. It is of course also possible to lower the time $\delta ti$ to the value 0 as indicated in the curve V but this change will normally take place only gradually as shown. The additional enrichment and its influence on the final magnitude of the fuel control pulses is arbitrary and may take place by varying the superposed influence of the damping circuit 6 on the influence of the circuit which causes the time-dependent enrichment by differentiation of the air flow rate signal LM. In addition, the influence of the temperature control part of the circuit is also variable so that it is possible, in principle, to produce any desired behavior of the fuel control change $\delta ti$ as a function of engine temperature of which the curve VI is another possible example.

In a preferred example of the circuit, a diode D20 and a resistor R30 is connected between the emitter of the transistor T1 (circuit point P4) and the resistor R13. Due to this connection, the differentiating capacitor exchanges charge with the circuit only slowly after the air flow flap has swung back so that the differentiating circuit can be retriggered by a renewed upward oscillation of the flap only after a predetermined time, for example 300 msec. This time-dependent block prevents a triggering of the enrichment circuit during gear-changing for example and prevents fuel enrichment due to the fact that the engine rpm rapidly rises when being reengaged by the clutch which would also cause the air flap to the air flow rate meter to undergo a large excursion. The fuel enrichment circuit only acts again when the driver intentionally actuates the gas pedal subsequent to clutch engagement.

The foregoing relates to preferred exemplary embodiments of the invention, it being understood that other embodiments and variants thereof are possible within the spirit and scope of the invention.

What is claimed and desired to be secured by Letters Patent of the United States is:

1. A method for enriching the fuel/air mixture delivered to an internal combustion engine having an induction manifold upon acceleration of the engine including an air sensor comprised of a mechanically undamped deflection vane which moves in a positive and negative direction and which generates an electrical air signal related to the air flow rate to the engine, and a fuel metering system; having a storage means, a decreasing means, a smoothing circuit, connected to the engine such that fuel metering to the engine is dependent on the air signal wherein the steps include:

operating the engine such that the deflection vane is in a first steady state position;

allowing effective overshooting of the deflection vane in the positive and negative direction upon acceleration of the engine above and below a second steady state position;

electrically sensing the peak value of deflection vane overshooting in the positive direction;

storing the peak value of deflection vane overshooting in the positive direction in the storage means;

simultaneously causing the fuel metering system to enrich the fuel/air mixture according to the peak value;

subsequent to causing the fuel metering system to enrich the fuel/air mixture, smoothing the air signal with the smoothing circuit only when the deflection vane moves in a negative direction which possibly overshoots the second steady state position;

gradually decreasing the stored peak value to a value representing the second steady state with the decreasing means; and simultaneously decreasing acceleration fuel enrichment to a normal fuel/air mixture according to the value representing the second steady state with the decreasing means.

2. A method as described in claim 1, wherein the fuel metering system includes a differentiator, a timing circuit, and wherein the deflection vane is disposed in the induction manifold and moved by air flow therein, the steps also including:

differentiating the air signal with the differentiator;

feeding the differentiated air signal to the timing circuit which generates an output approaching the air signal existing prior to differentiation at a preselected rate.

3. A method as described in claim 1, wherein the fuel metering system includes a supplementary circuit which detects engine start, engine overrun or engine temperature, the steps also including:

influencing the enrichment of the fuel/air mixture with the supplementary circuit according to engine start, engine overrun or engine temperature.

4. An apparatus for enriching the fuel/air mixture of an internal combustion engine, having an air-sensing deflection vane which moves in a positive and negative direction and which generates an electrical air signal indicative of air flow rate in the engine, a fuel metering system connected to the engine and the deflection vane to meter fuel according to the air signal, the apparatus including:

a detection means to detect deflection vane movement and which generates a value indicative thereof and determines a peak value of deflection vane overshoot in the positive direction beyond a subsequent steady state value;

a storage means connected to the detection means to receive and store the peak value;

an enrichment circuit connected to the storage means and the fuel metering system to enrich the fuel/air mixture according to the peak value;

a smoothing circuit connected to the deflection vane to receive and smooth the air signal and connected to the detection means such that the smoothing circuit smoothes the air signal only when the deflection vane moves in the negative direction; and a decreasing means connected to the memory and the detection means which decreases the peak value to equal the subsequent steady state value, and wherein the decreasing means decreases fuel enrichment to a normal fuel/air mixture value according to the subsequent steady state value.

5. An apparatus as defined by claim 4, wherein the decreasing means includes a capacitor connected to a high-impedance discharge path for causing the gradual adaptation of the air signal to the subsequent steady-state value.

6. An apparatus as defined by claim 5, further comprising a second low impedance path for said the capacitor whereby the charge on the capacitor is rapidly changed to accept the voltage according to the stored air signal value.

7. An apparatus as defined by claim 4, wherein said air signal is produced partly by a potentiometer having a wiper connected to the base of an emitter-follower transistor having an emitter connected through a resistor to ground and also connected to a timing capacitor in said decreasing means as well as being connected to a positive voltage supply line through a high-value resistor.

8. An apparatus as defined by claim 4, also including transducers, further comprising a blocking circuit connected to the decreasing means to at least partially prevent the fuel enrichment due to the decreasing means output on the basis of signals received from the transducers which are connected to sense engine temperature, engine starting and engine overrunning.

9. An apparatus as defined by claim 8, wherein there is provided a voltage divider, a plurality of circuit lines, a low value resistor, a fifth diode, a high impedance current path and a third transistor connected to the voltage divider biasing the third transistor at a definite potential, a base of the third transistor being connected selectively to one of the plurality of circuit lines receiving respectively engine temperature signals, engine starting signals and engine overrunning signals from the transducers, a collector of the third transistor being connected to the junction of the low value resistor and the fifth diode; whereby when the engine is warmed up or is being started or is being operated in overrunning condition, an additional low impedance current path is provided in parallel with the high impedance current path to permit the change of charge on the capacitor.

10. An apparatus as defined by claim 9, wherein said blocking circuit includes second and and third voltage dividers, a sixth, seventh and eighth diode, seventh and eighth resistors, a second and a fourth transistor having a base which receives the transducer signals, and whose emitter is connected through the sixth diode and the seventh resistor to the second voltage divider connected to the emitter of the third transistor and wherein a collector of the second transistor is connected in series with the seventh diode and the eighth resistor so as to block the eighth diode in the third voltage divider circuit connected to the collector of the second transistor.

11. An apparatus as defined by claim 4, further comprising a switching circuit connected to block the operation of the decreasing means when the engine is operating in overrunning condition and the air signal falls below a predetermined threshold value.

12. An apparatus as defined by claim 4, further comprising a blocking circuit associated with said timing circuit means to at least partially block the enrichment performed by said timing circuit means on the basis of signals related to engine temperature and engine starting.

13. An apparatus as defined in claim 4, having a timing circuit means which includes a fourth transistor a ninth diode and a pulse width limiting circuit, wherein a collector of the fourth transistor is connected through the ninth diode to the pulse width limiting circuit which is triggered by pulses synchronous with fuel injection control pulses from the fuel metering system of the engine for providing an increased limit of the fuel injection control pulses during an acceleration enrichment domain of the engine.

14. An apparatus as defined by claim 13, wherein the pulse width limiting circuit includes a monostable flip-flop.

15. An apparatus as defined in claim 4, also including:
a differentiating circuit connected to the deflection vane to differentiate the air signal; and
a Miller integrator connected to the differentiating circuit to receive the differentiated air signal and connected to the fuel metering system to control fuel injection with a time decaying output signal.

16. An apparatus as defined by claim 15, wherein the decreasing means includes a transistor, a first diode, and a first resistor, wherein the capacitor is connected to the first diode in series with the first resistor, wherein the first diode and first resistor are connected in parallel with the capacitor and to the transistor; whereby the charge on the capacitor is changed when the air signal increases.

17. An apparatus as defined by claim 16, wherein the decreasing means also includes a junction of the capacitor with a high value resistor which is connected to the base of a further transistor having an emitter which constitutes a first circuit point which represents the output of the decreasing means.

18. An apparatus as defined by claim 17, wherein a positive electrode of said potentiometer is a second circuit point which is connected through a second resistor to said first circuit point and is also connected via a second diode with the junction of the first diode and the first resistor; whereby, when the decreasing means is inoperative, the second circuit point carries substantially the same potential as the first circuit point.

19. An apparatus as defined by claim 18, wherein the second circuit point is connected via a third resistor to an anode of the second diode; whereby the response of the decreasing means is determined.

20. An apparatus as defined by claim 18, wherein the emitter of the emitter follower transistor constitutes a third circuit point which is connected to an electrode of the capacitor and carries substantially the magnitude of said air signal and is connected through a fourth resistor to the differentiating circuit and wherein the output of the Miller integrator comprises a second transistor, a fifth resistor and a third diode wherein a collector of the second transistor is connected through the fifth resistor and through the third diode to the apparatus.

21. An apparatus as defined by claim 20, further comprising a fourth diode and a sixth resistor connected between the emitter of the emitter follower transistor and a negative supply line of the circuit; whereby the enrichment of the fuel-air mixture is blocked for a limited time.

* * * * *